United States Patent
Hsu (10) Patent No.: US 8,483,320 B2
(45) Date of Patent: Jul. 9, 2013

(54) DATA RECOVERY APPARATUS AND METHOD BY USING OVER-SAMPLING

(75) Inventor: Chia-Hao Hsu, Changhua County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 327 days.

(21) Appl. No.: 13/071,528

(22) Filed: Mar. 25, 2011

(65) Prior Publication Data

US 2012/0170697 A1    Jul. 5, 2012

(30) Foreign Application Priority Data

Dec. 30, 2010   (TW) ................................ 99146765 A (51) Int. Cl.
*H04L 27/00*   (2006.01)
(52) U.S. Cl.
USPC .......................................... 375/326; 714/700
(58) Field of Classification Search
USPC ....... 370/200–546; 375/130–377; 455/1–899; 714/1–56, 699–824
See application file for complete search history.

(56) References Cited

U.S. PATENT DOCUMENTS

| | | | |
|---|---|---|---|
| 5,905,769 A * | 5/1999 | Lee et al. | 375/376 |
| 5,974,464 A * | 10/1999 | Shin et al. | 709/231 |
| 6,266,799 B1 * | 7/2001 | Lee et al. | 716/113 |
| 7,522,686 B2 * | 4/2009 | Nam et al. | 375/355 |
| 8,014,480 B1 * | 9/2011 | Zhuang et al. | 375/355 |
| 8,085,880 B2 * | 12/2011 | Farjad-rad | 375/332 |
| 8,090,971 B2 * | 1/2012 | Sarmento | 713/400 |
| 8,358,725 B2 * | 1/2013 | Bogdan | 375/354 |
| 2003/0038659 A1 * | 2/2003 | Takahashi et al. | 327/141 |
| 2003/0091136 A1 * | 5/2003 | Sugita | 375/355 |
| 2003/0212930 A1 * | 11/2003 | Aung et al. | 714/700 |
| 2004/0042577 A1 * | 3/2004 | Sumiyoshi et al. | 375/368 |
| 2005/0220240 A1 * | 10/2005 | Lesso | 375/372 |
| 2006/0227916 A1 * | 10/2006 | Masui et al. | 375/355 |
| 2006/0256909 A1 * | 11/2006 | On et al. | 375/376 |
| 2008/0069196 A1 * | 3/2008 | Choi | 375/231 |
| 2008/0095291 A1 * | 4/2008 | Cafaro et al. | 375/373 |
| 2008/0315928 A1 * | 12/2008 | Waheed et al. | 327/159 |
| 2008/0317188 A1 * | 12/2008 | Staszewski et al. | 375/376 |
| 2009/0041104 A1 * | 2/2009 | Bogdan | 375/226 |
| 2009/0323853 A1 * | 12/2009 | Hsu | 375/294 |
| 2010/0283654 A1 * | 11/2010 | Waheed et al. | 341/166 |
| 2011/0090101 A1 * | 4/2011 | Venkata et al. | 341/101 |

* cited by examiner

*Primary Examiner* — Daniel Washburn
*Assistant Examiner* — Amneet Singh
(74) *Attorney, Agent, or Firm* — Jianq Chyun IP Office (57) ABSTRACT

A data recovery apparatus and method by using over-sampling are provided. The data recovery apparatus by using over-sampling includes an over-sampling module, a data regeneration unit, a phase alignment unit, a phase decision module, and an output data correction unit. The over-sampling module samples serial data according to a clock signal, so as to output M-bit data, in which each bit in the serial data is sampled N times. The phase alignment unit selects specific M-bit data from a P-bit signal output by the data regeneration unit, and distinguishes the specific M-bit data to X groups of N-bit signals. The phase decision module determines a direction of phase adjustment according to the specific M-bit data. The output data correction unit selects and outputs first or second recovery data constituted by first or second specific bits of each group of N-bit signal according to the direction of phase adjustment.

16 Claims, 11 Drawing Sheets

DATA RECOVERY APPARATUS AND METHOD BY USING OVER-SAMPLING

CROSS-REFERENCE TO RELATED APPLICATION

This application claims the priority benefit of Taiwan application serial no. 99146765, filed Dec. 30, 2010. The entirety of the above-mentioned patent application is hereby incorporated by reference herein and made a part of this specification.

BACKGROUND OF THE INVENTION

1. Field of the Invention

The present invention generally relates to a data recovery technology, in particular, to a data recovery apparatus and method by using over-sampling.

2. Description of Related Art

The current image transfer technology may use Transition Minimized Differential Signaling (TMDS) specification or High Definition Multimedia Interface (HDMI) specification for delivery of image signals. According to the TMDS and the HDMI specification standards, a clock signal transferred by a transmitter (Tx) is about 25 to 165 Mhz, and a data transmission rate of an image signal thereof is 10 times of the clock signal. That is to say, in a clock signal cycle, each color channel (including red (R) channel, green (G) channel, and blue (B) channel) bears 10 bits of serial data. Therefore, a receiver (Rx) device employing the TMDS and HDMI specifications must pick and recover the serial data in the color channels by using the relation above.

Figure 1:
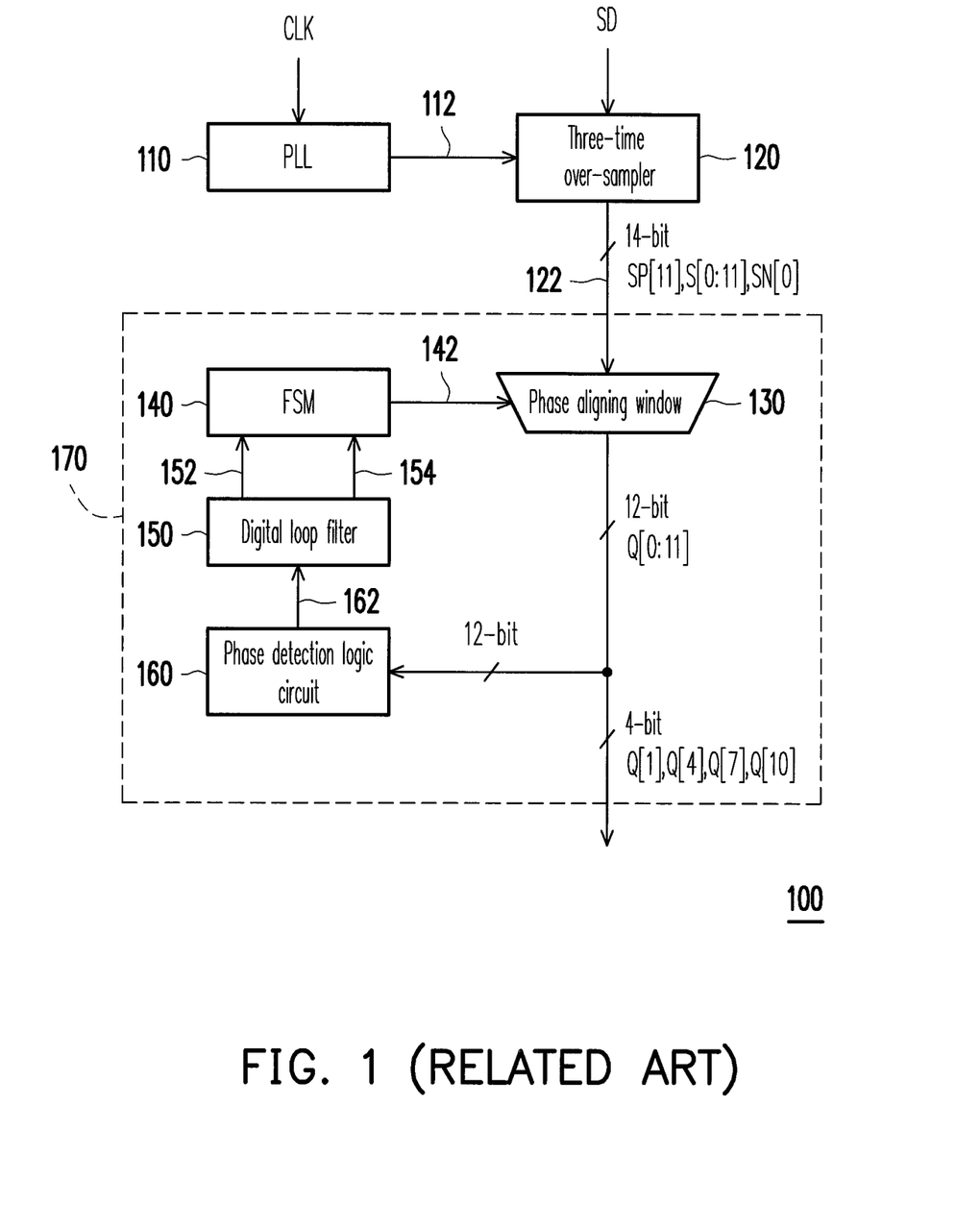
FIG. 1 is a block diagram of a conventional data recovery system by using 3× over-sampling.

Among numerous methods for picking data, in order to improve the success ratio of data recovery, data is generally recovered by using over-sampling. FIG. 1 is a block diagram of a conventional data recovery system 100 by using 3× over-sampling. A phase aligning window 130, a phase detection logic circuit 160, a digital loop filter 150, and a phase-aligning finite state machine (phase aligning FSM) 140 may be collectively referred to as digital phase-locked loop (PLL) 170. A PLL 110 receives a clock signal CLK, and multiples the phase of the clock signal CLK by 2.5 times, so as to output 12 multiphase clock signals 112 with different phases to a 3× over-sampler 120.

The 3× over-sampler 120 samples the serial data SD by the multiphase clock signals 112 to generate 12-bit data S[0:11], in which each bit in the serial data SD is sampled three times. In addition, the 3× over-sampler 120 also combines previously sampled last 1 bit of data SP[11] with subsequently sampled first bit of data SN[0] and the 12-bit data S[0:11] to form 14-bit data 122, and outputs the 14-bit data 122 to the phase aligning window 130. The phase aligning window 130 can use a phase aligning signal 142 to pick 12 pieces of over-sampling data from the 14-bit data 122 to form a 12-bit signal Q[0:11], and pick 4-bit signal Q[1] Q[4] Q[7] Q[10] from the 12-bit signal Q[0:11] as recovered data for output.

In addition, the phase detection logic circuit 160 can determine and read the cases such as offset existing between the serial data SD and the clock signal CLK and high-frequency jitter according to the 12-bit data Q[0:11], so as to correspondingly output a phase detection signal 162. The digital loop filter 150 outputs a phase correction recommendation signal according to the phase detection signal 162, that is, a phase forward signal 152 and a phase backward signal 154. Therefore, the phase aligning FSM 140 can generate the phase aligning signal 142 according to the phase forward signal 152 and the phase backward signal 154, so as to drive the phase aligning window 130 to pick 12-bit signal Q[0:11] from the 14-bit data 122, thereby lowering the error probability of data recovery.

Figure 2:
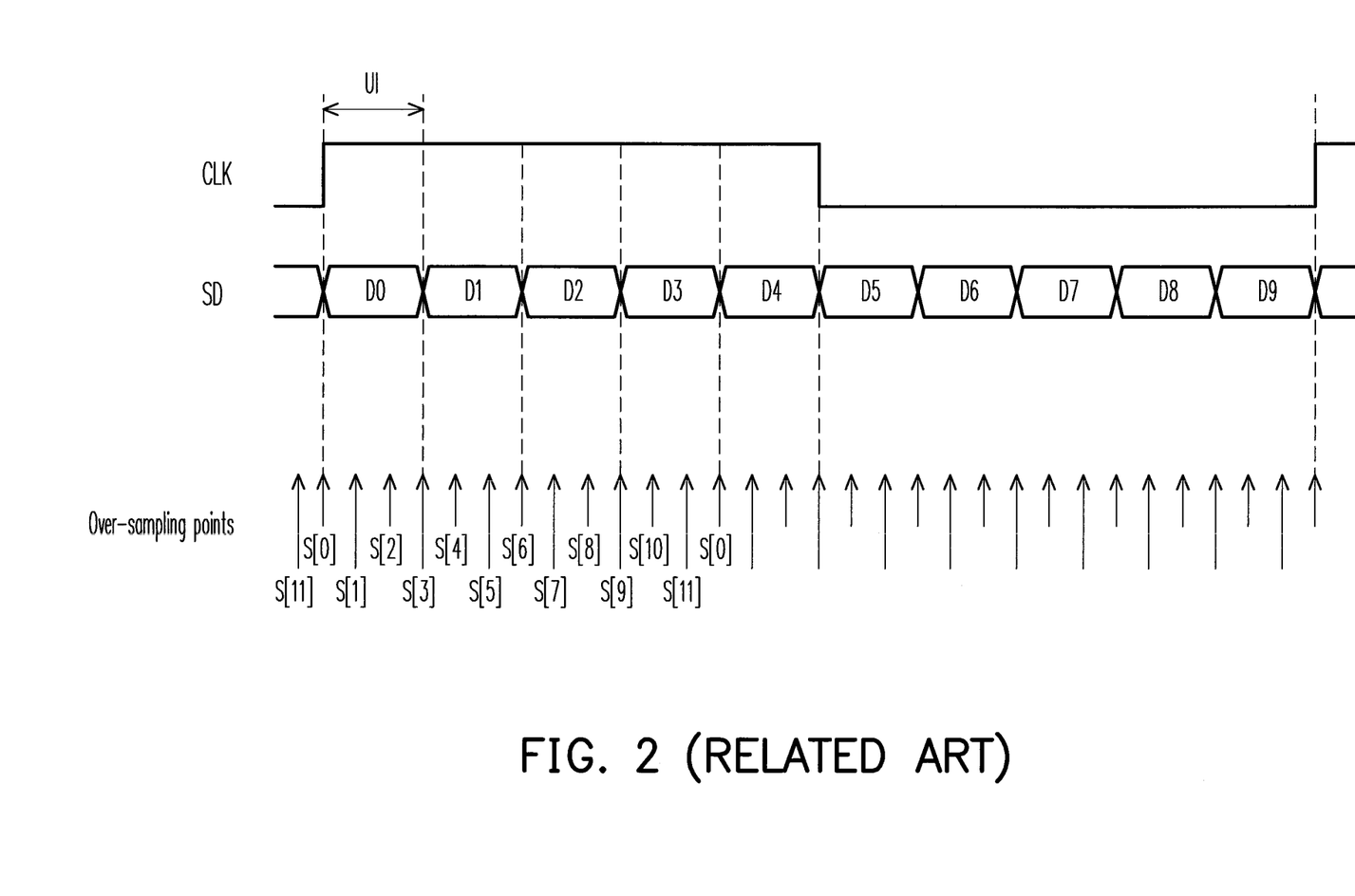
FIG. 2 is a schematic view of conventional data recovery by using 3× over-sampling.

FIG. 2 is a schematic view of conventional data recovery by using 3× over-sampling. The transmission time of each bit of data is referred to as one data unit (UI). Referring to FIG. 1 and FIG. 2, based on the above, as the serial data SD carries ten bits of data D0 to D9 in a cycle of clock signal CLK, the 3× over-sampler 120 samples 4-bit data (for example, D0 to D3 in this embodiment) by using rising edges (not shown) of 12 multiphase clock signals 112 at each time, so as to generate 12-bit data S[0:11], and obtains previously sampled last 1 bit of data SP[11] and subsequently sampled first bit of data SN[0] to generate 14-bit data 122.

In general, a data recovery method by using over-sampling frequently employs an odd-time over-sampling technology, because the over-sampled data located centrally (for example, bit signals Q[1], Q[4], Q[7], and Q[10] in the examples above) are theoretically closer to a center of a data eye, and may be output as recovered data. The over-sampled data at two sides (for example, bit signals Q[0], Q[2:3], Q[5:6], Q[8:9], and Q[11] in the examples above) is influenced by Inter Symbol Interference (ISI) or high-frequency jitter, thus being inaccurate.

However, in case that offset between the serial data and the clock signal is too high, or a range influenced by ISI or high-frequency jitter in the serial data is higher than ⅓ data unit (UI), the error probability of the 3× over-sampling technology is correspondingly enhanced. In case of data recovery by using a higher-time over-sampling technology, though the error probability is low, a larger circuit area is required at the cost, and power consumption is increased accordingly. In addition, in an even-time over-sampling technology, there are two over-sampling points that are close to the center of the data eye, and thus how to select an over-sampling point for output is a problem intended to be solved by the even-time over-sampling technology.

SUMMARY OF THE INVENTION

The present invention is directed to a data recovery apparatus by using 4× over-sampling, which can select bit data of over-sampled points according to a direction of phase adjustment for output, thereby providing good ISI and jitter tolerances, and lowering the error probability of data recovery.

In another aspect, the present invention is directed to a data recovery apparatus by using 4× over-sampling, which can select bit data of over-sampled points according to a direction of phase adjustment for output, thereby providing good ISI and jitter tolerances, and lowering the error probability of data recovery.

The present invention provides a data recovery apparatus by using over-sampling, which includes an over-sampling module, a data regeneration unit, a phase alignment unit, a phase decision module, and an output data correction unit. The over-sampling module receives a clock signal and serial data, and samples the serial data according to the clock signal, so as to output M-bit data, in which each bit in the serial data is sampled N times, M, and N are integers, and N>3. The data regeneration unit coupled to the over-sampling module receives and combines previous and current M-bit data, so as to form a P-bit signal, in which P is a positive integer and P>M. The phase alignment unit selects specific M-bit data from the P-bit signal, and distinguishes the specific M-bit data to X groups of N-bit signals, X is a positive integer and M=X×N. The phase decision module determines a direction of phase adjustment according to the specific M-bit data. The output data correction unit combines first and second specific bits of each group of N-bit signal into first and second recovery data, and selects and outputs the first or second recovery data according to the direction of phase adjustment.

In view of above, in the present invention, in order to obtain more accurate recovery data (in other words, in order to make the output over-sampling point closer to a center of a data eye), so as to lower the error probability, the output data correction unit selects one of two pieces of recovery data that is closer to the center of the data eye according to the direction of phase adjustment determined by the phase decision module, thereby providing good ISI and jitter tolerances, and lowering the error probability of data recovery.

In order to make the above features and advantages of the present invention more comprehensible, embodiments are described in detail below with reference to accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 3:
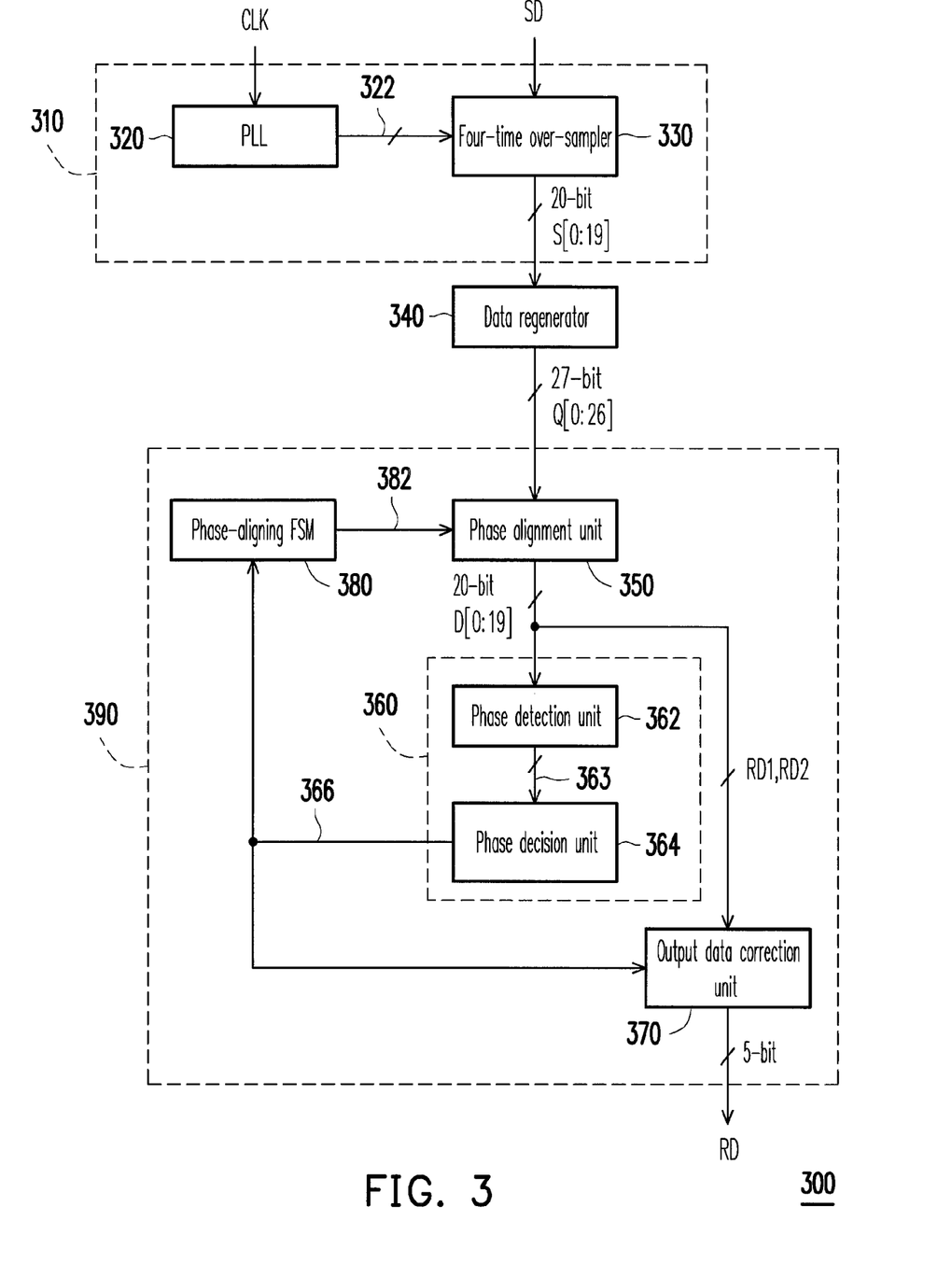
FIG. 3 is a block diagram of a data recovery apparatus by using over-sampling according to an embodiment of the present invention.

FIG. 3 is a block diagram of a data recovery apparatus 300 by using over-sampling according to an embodiment of the present invention. This embodiment is implemented with the data recovery apparatus 300 by using 4× over-sampling, and data recovery of 5-bit serial data SD is performed at each time. However, the spirit of the embodiment of the present invention is applicable in any data recovery apparatus by using more-than-3-time over-sampling, and persons practicing this embodiment can adjust the number of bits of the serial data SD in data recovery at each time, according to the design demands; however this embodiment is not limited thereto.

As shown in FIG. 3, the data recovery apparatus 300 by using over-sampling includes an over-sampling module (for example, but not limited to, 4× over-sampling module 310), a data regeneration unit 340, a phase alignment unit 350, a phase decision module 360, and an output data correction unit 370. In this embodiment, the data recovery apparatus 300 further includes a phase aligning FSM 380. The phase aligning FSM 380, the phase alignment unit 350, the phase decision module 360, and the output data correction unit 370 may be collectively referred to as a digital PLL 390.

Figure 4:
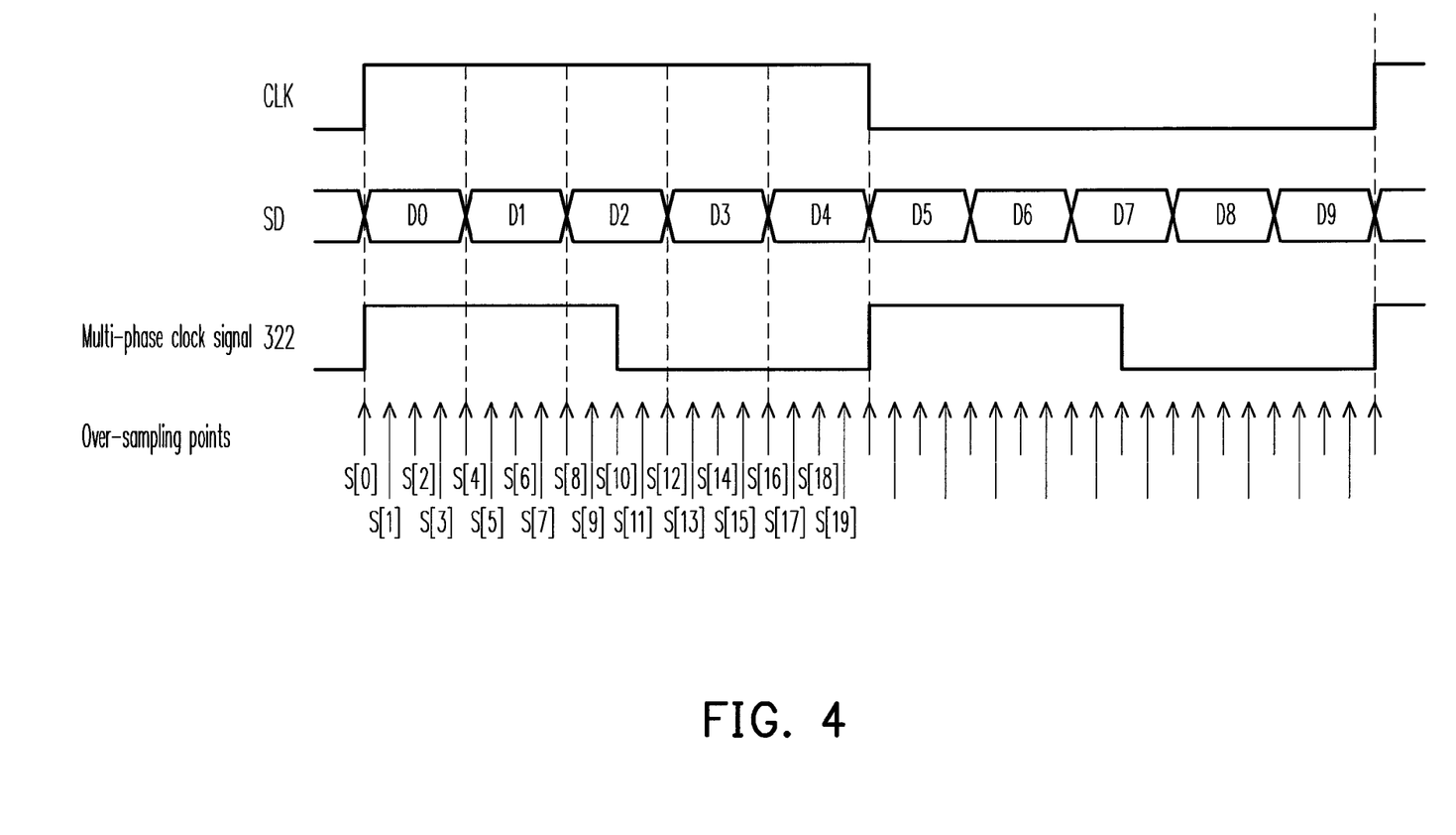
FIG. 4 is a schematic view of a clock signal, serial data, and over-sampling points according to an embodiment of the present invention.

FIG. 4 is a schematic view of a clock signal CLK, serial data SD, and over-sampling points according to an embodiment of the present invention. Referring to FIG. 3 and FIG. 4, in this embodiment, the 4× over-sampling module 310 includes a PLL 320 and a 4× over-sampler 330. The PLL 320 receives the clock signal CLK, and multiples the frequency of the clock signal CLK by 2 times to output 20 multiphase clock signals 322 with a phase difference of 18 degrees (only a first multiphase clock signal 322 is shown in FIG. 4 as an example). The 4× over-sampler 330 receives the serial data SD, and samples five pieces of data D0-D4 in the serial data by using rising edges of the multiphase clock signals 322, so as to generate 20-bit data S[0:19], in which the 4× over-sampler 330 may sample 5-bit serial data SD in a multiphase clock cycle of the multiphase clock signal 322, and each bit is sampled 4 times.

Then, when receiving the 20-bit data S[0:19], the data regeneration unit 350 may combine the last 7-bit data SP[13:19] sampled in a previous clock cycle with the 20-bit data S[0:19], so as to output 27-bit data Q[0:26]. Moreover, after obtaining the 27-bit data Q[0:26], the phase alignment unit 350 selects 20-bit data D[0:19] in the 27 bit data Q[0:26] according to a phase adjustment signal 382 of the phase aligning FSM 380, and distinguishes the 20-bit data D[0:19] into 5 groups of 4-bit data, that is, 4-bit data of Groups 1-5 (G1-G5) are respectively D[0:3], D[4:7], D[8:11], D[12:15], and D[16:19].

Therefore, the phase decision module 360 obtains 20-bit data D[0:19] adjusted by the phase alignment unit 350; however, in theory, there are two over-sampling points in the same data unit (UI) that are close to a center of a data eye. Therefore, a critical point of the embodiment of the present invention is that the output data correction unit 370 can select and output data of an over-sampling point that is closer to the center of the data eye according to the direction of phase adjustment of the phase decision module 360.

Figure 5:
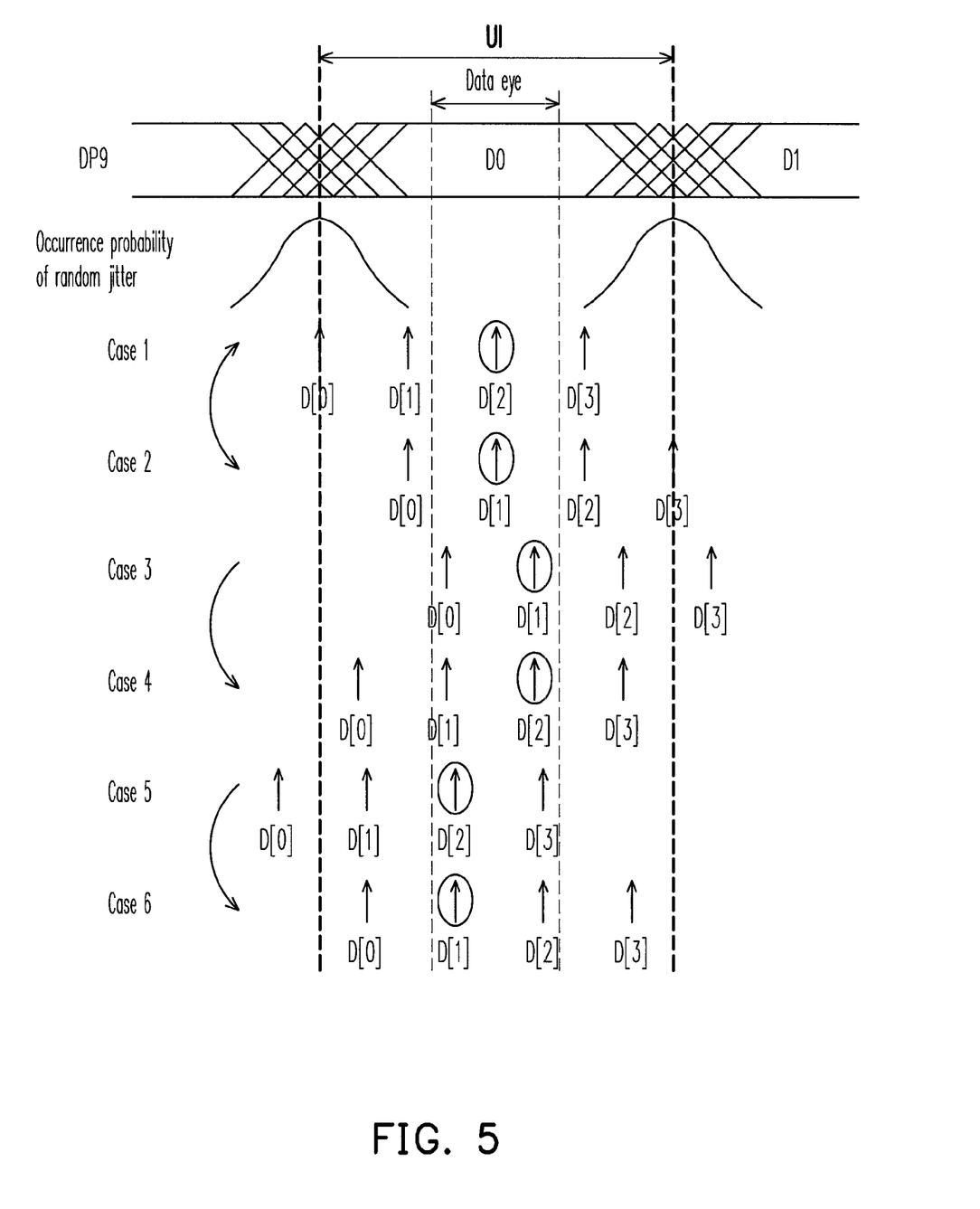
FIG. 5 is a schematic view of bit data, and over-sampling points under different circumstances according to an embodiment of the present invention.

FIG. 5 is a schematic view of bit data D0, and over-sampling points under different circumstances according to an embodiment of the present invention. In this embodiment, for example, the data recovery apparatus 300 by using over-sampling only samples 1-bit data (for example, bit data D0 in FIG. 5) at each time, for simplification of description.

FIG. 5 also shows occurrence probability of ISI or high-frequency jitter. The closer the over-sampling point to a conversion point of bit data (that is, closer to two sides of the data unit (UI)) is, the higher the occurrence probability of the high-frequency jitter is. In addition, the bit data D0 in a data eye region is not influenced by ISI or high-frequency jitter, and thus the over-sampling point in the data eye is the most preferred recovery data for output. Furthermore, it is assumed that the bit data D0 is "1", and bit data DP9 and D1 are "0", for ease of exemplification.

In view of the above, Case 1 in FIG. 5 is a first group of 4-bit data D[0:3] obtained by over-sampling the bit data D0 under an ideal condition (that is, offset does not exist between the clock signal CLK and the serial data SD), and adjusting by the phase alignment unit 350. Data D[2] locates in the data eye region, and thus the most preferred recovery data for output is data D[2]. Moreover, data D[0] locates in a position having the highest high-frequency jitter probability, and thus D[0:3] is most probably [0, 1, 1, 1]. Thereby, in this embodiment, after receiving D[0:3] of [0, 1, 1, 1], the phase decision module 360 enables a right-shift signal, so as to enable the output data correction unit 370 to output the data D[2], and the phase alignment unit 350 also samples by right-shifting 1 bit at next time, as shown by Case 2 in FIG. 5.

In Case 2, as data D[1] is the most preferred recovery data for output, and D[0:3] is most probably [1, 1, 1, 0]. Therefore, after receiving D[0:3] of [1, 1, 1, 0], the phase decision module 360 enables a left-shift signal, so as to enable the output data correction unit 370 to output the data D[1], and the phase alignment unit 350 also samples by left-shifting 1 bit at next time, and thus Case 1 in FIG. 5 is repeated. Based on the above, in this embodiment, a 4× over-sampling technology is used to accurately output the recovery data while lowering the error probability.

Cases 3 to 6 in FIG. 5 have data offset. In Case 3, data D[0] and D[1] are both most preferred recovery data for output, and D[0:3] is [1, 1, 1, 0]. Based on the teachings above, the left-shift signal is enabled, and thus the output data correction unit 370 outputs the data D[1], and the phase alignment unit 350 also samples by left-shifting 1 bit to Case 4 at next time. Likewise, in Case 5, data D[2] and D[3] are both most preferred recovery data for output, and D[0:3] is [0, 1, 1, 1]. Therefore, the right-shift signal is enabled, and thus the output data correction unit 370 outputs the data D[2], and the phase alignment unit 350 also samples by right-shifting 1 bit to Case 6 at next time.

Enabling mode of the phase decision module 360 as shown in FIG. 3 and circuit architecture thereof are described in detail below. As shown in FIG. 3, the phase decision module 360 includes a phase detection unit 362 and a phase decision unit 364, and the phase detection unit 362 can calculate a detection signal set 363 according to the 20-bit data D[0:19]. Thereby, the phase decision unit 364 can determine the offset between the clock signal CLK and the serial data SD according to the detection signal set 363, and output a phase correction recommendation signal 366 (that is, the phase correction recommendation signal 366 includes the left-shift signal and the right-shift signal), thereby adjusting a direction of phase alignment. As a result, the phase decision module 360 may determine whether there is a need to shift leftwards or rightwards by 1 bit in phase alignment. The phase aligning FSM 380 outputs the phase adjustment signal 382 according to the phase correction recommendation signal 366.

Figure 6:
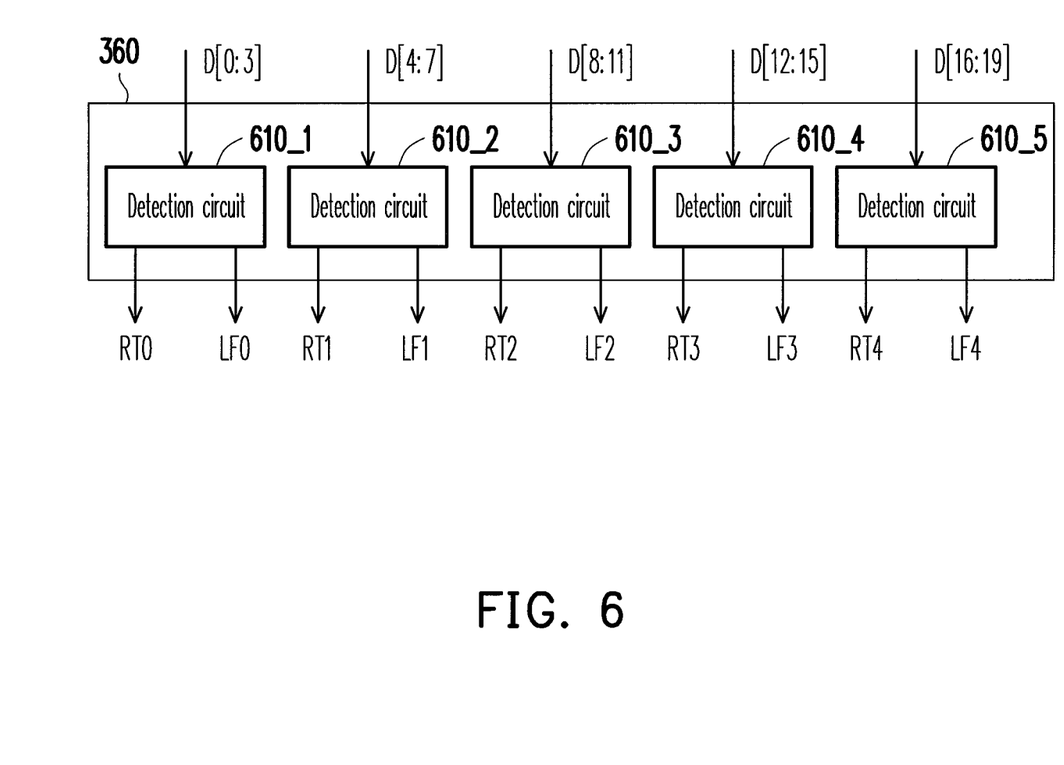
FIG. 6 is a block diagram of a phase detection unit as shown in FIG. 3.

FIG. 6 is a block diagram of a phase detection unit 362 as shown in FIG. 3. As shown in FIG. 6, the phase detection unit 362 includes 5 identical detection circuits 610_1 to 610_5, and each of the detection circuits 610_1 to 610_5 is corresponding to and receives a group of 4-bit data, for example, a first detection circuit 610_1 receives 4-bit data D[0:3] of a first group G1, the second detection circuit 610_2 receives 4-bit data D[4:7] of a second group G2, and the rest may be deduced by analogy. According to the 4-bit data, the detection circuits 610_1 to 610_5 generate detection left-shift signals LF0 to LF4 and detection right-shift signals RT0 to RT4 respectively, and the detection left-shift signals LF0 to LF4 and detection right-shift signals RT0 to RT4 form the detection signal set 363 to be transmitted to the phase decision unit 364.

Figure 7:
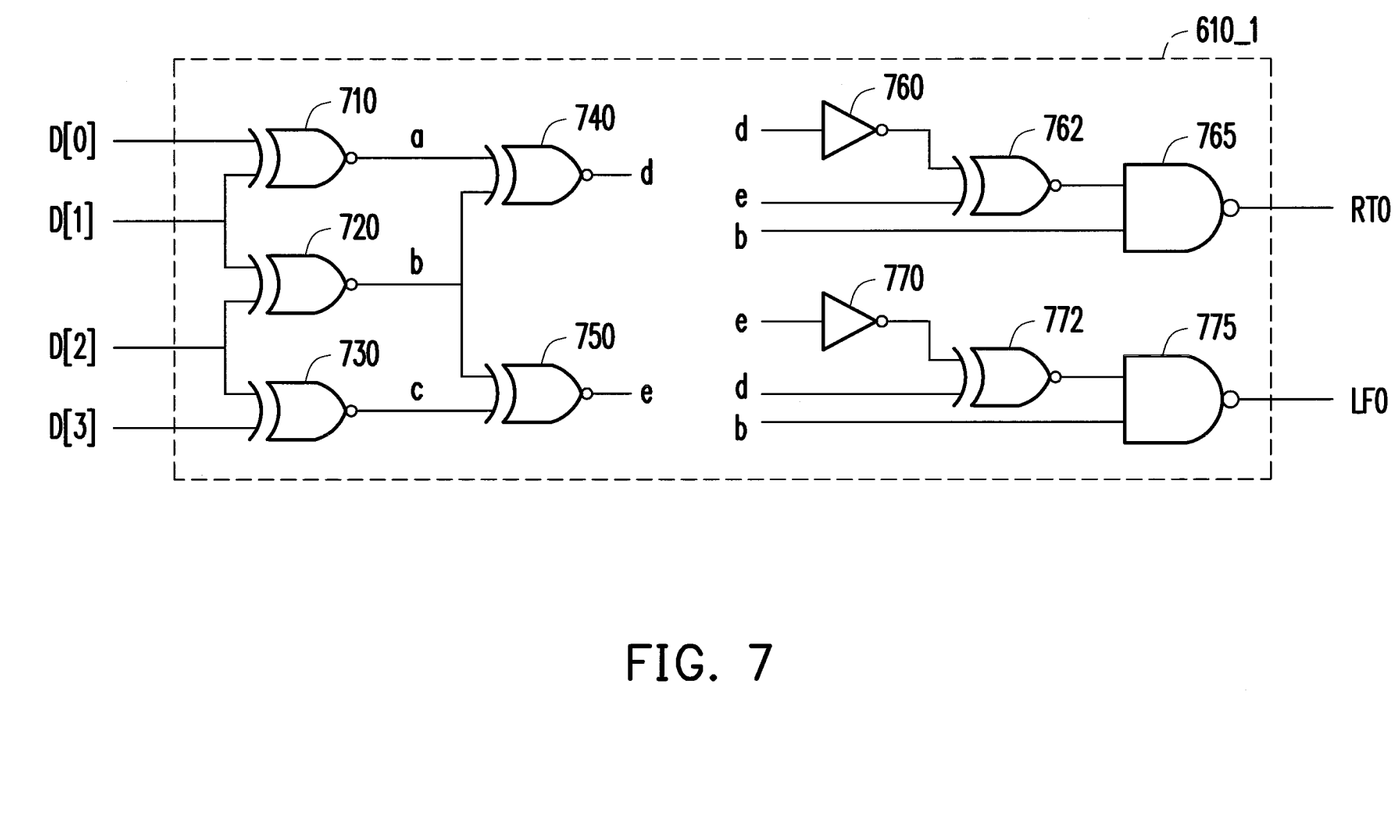
FIG. 7 is a logic circuit diagram of a detection circuit as shown in FIG. 6.

FIG. 7 is a logic circuit diagram of a detection circuit 610_1 as shown in FIG. 6. In this embodiment, as the detection circuits 610_1 to 610_5 are of the same circuit architecture, description is made with the detection circuit 610_1 as an example. As shown in FIG. 7, the detection circuit 610_1 includes XNOR gates 710 to 750, NOT gates 760 and 770, XNOR gates 762 and 772, and NAND gates 765 and 775. The XNOR gate 710 receives data D[0] and D[1] to generate a signal a, the XNOR gate 720 receives data D[1] and D[2] to generate a signal b, and the XNOR gate 730 receives data D[2] and D[3] to generate a signal c. The XNOR gate 740 receives the signals a and b to generate a signal d, and the XNOR gate 750 receives the signal b and c to generate a signal e.

Referring to FIG. 7 again, the NOT gate 760 receives the signal d, and the XNOR gate 762 is coupled to an output end of the NOT gate 760 and receives the signal e. An output end of the XNOR gate 762 is coupled to a first input end of the NAND gate 765, and a second input end of the NAND gate 765 receives the signal b, so as to generate a detection right-shift signal RT0 at an output end of the NAND gate 765. In addition, the NOT gate 770 receives signal e, and the XNOR gate 772 is coupled to an output end of the NOT gate 770 and receives the signal b. An output end of the XNOR gate 772 is coupled to a first input end of the NAND gate 775, and a second input end of the NAND gate 775 receives the signal b, so as to generate a detection left-shift signal LF0 at an output end of the NAND gate 775.

According to the embodiment of the present invention, when D[0:3] is [0, 0, 0, 1] or [1, 1, 1, 0], the detection left-shift signal LT0 is output to be "1", so as to be enabled, or otherwise, output to be "0". Moreover, when D[0:3] is [1, 0, 0, 0] or [0, 1, 1, 1], the detection right-shift signal RT0 is output to be "1", so as to be enabled, or otherwise, output to be "0". In other words, when the detection right-shift signal RT0 is enabled, it indicates that the tendency for right-shifting the over-sampled data by 1 bit is increased, and when the detection left-shift signal LF0 is enabled, it indicates that the tendency for left-shifting the over-sampled data by 1 bit is increased.

Figures 8, 9:
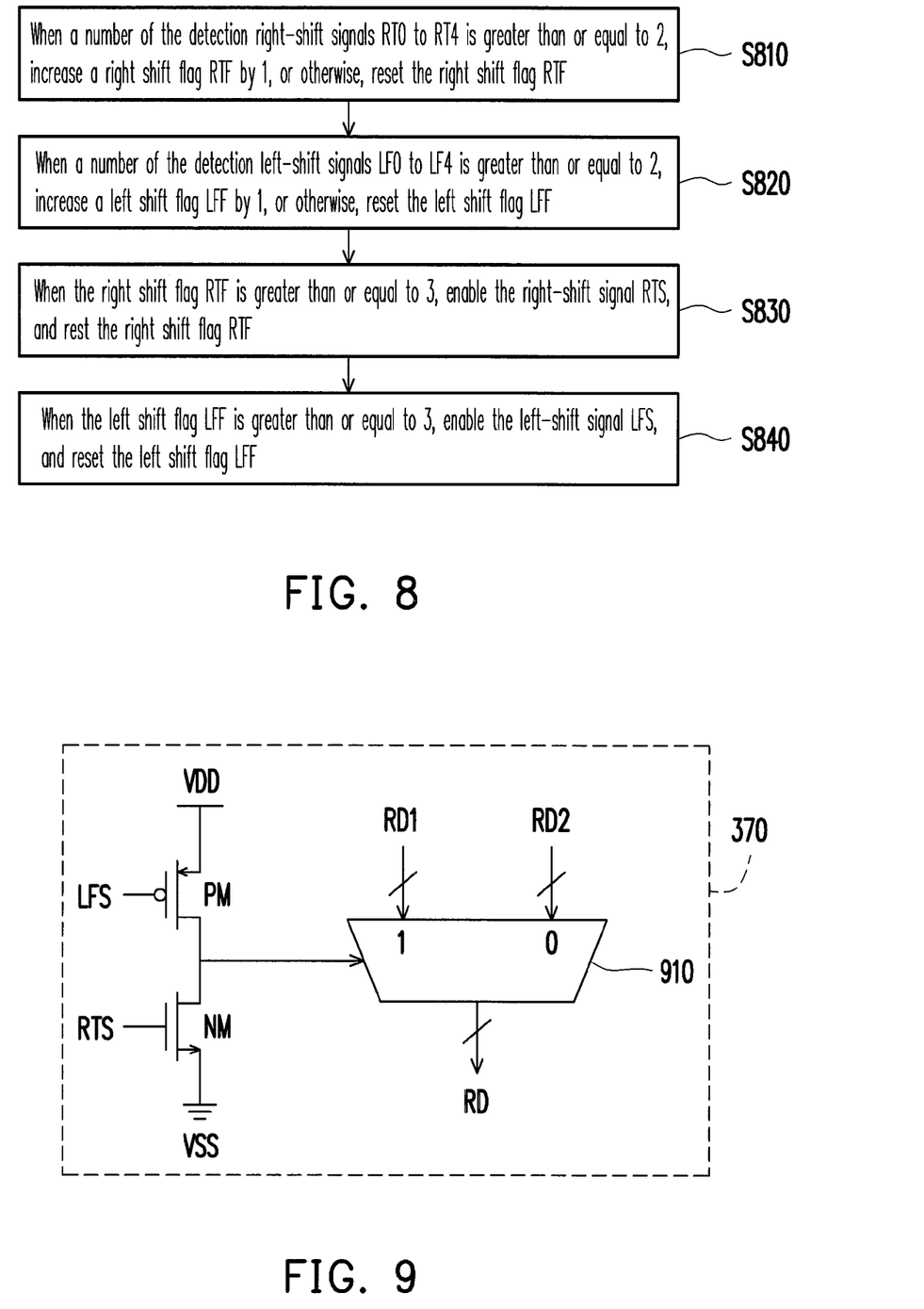
FIG. 8 is a flow chart of a determination process of a phase decision unit as shown in FIG. 3.
FIG. 9 is a circuit diagram of an output data correction unit as shown in FIG. 3.

The phase decision unit 364 makes statistics on the left-shift signals LF0 to LF4 and the detection right-shift signals RT0 to RT4 of the detection circuits 610_1 to 610_5, so as to output the phase correction recommendation signal 366, and the determination process is as shown in FIG. 8, which is a flow chart of a determination process of a phase decision unit 364 as shown in FIG. 3.

First, in Step S810, when a number of the enabled detection right-shift signals RT0 to RT4 in the detection signal set 363 is greater than or equal to 2, the phase decision unit 364 increases a right shift flag RTF therein by 1, or otherwise, resets the right shift flag RTF. Then, in Step S820, when a number of the enabled detection left-shift signals LF0 to LF4 is greater than or equal to 2, the phase decision unit 364 increases a left shift flag LFF by 1, or otherwise, resets the left shift flag LFF. In Step S830, when the right shift flag RTF is greater than or equal to 3, the phase decision unit 364 enables the right-shift signal RTS, and resets the right shift flag RTF, and in Step S840, when the left shift flag LFF is greater than or equal to 3, the phase decision unit 364 enables the left-shift signal LFS, and reset the left shift flag LFF.

Based on the above, when the number of the enabled detection right-shift signals RT0 to RT4 in continuous 3 times of sampling is greater than or equal to 2, the phase decision unit 364 enables the right-shift signal RTS (when enabled, the right-shift signal RTS is, but not limited to, logic "1"), and when the number of the enabled detection left-shift signals LF0 to LF4 in continuous 3 times of sampling is greater than or equal to 2, the phase decision unit 364 enables the left-shift signal LFS (when enabled, the right-shift signal RTS is, but not limited to, logic "0").

Referring back to FIG. 3, the output data correction unit 370 may be coupled to the phase alignment unit 350 and the phase decision module 360, obtains first specific bits and second specific bits in 4-bit signals of the groups G1 to G5 that are the closest to the center of the data eye, forms first recovery data RD1 and second recovery data RD2 with the specific bits, and selects and outputs the first recovery data RD1 or the second recovery data RD2 according to whether the right-shift signal RTS and the left-shift signal LFS are enabled.

In particular, the first recovery data RD1 and the second recovery data RD2 in this embodiment are both 5-bit recovery data, in which the first recovery data RD1 is formed of the second highest bits of the groups of 4-bit signals (that is, data D[1], D[5], D[9], D[13] and D[17]), and the second recovery data RD2 is formed of the second lowest bits of the groups of 4-bit signals (that is, data D[2], D[6], D[10], D[14], and D[18]). Moreover, in other embodiments in the spirit of the present invention that employ N-time over-sampling technology (N is a positive integer and N>3) as an implementation mode thereof, the first recovery data RD1 is formed of $Y^{th}$ highest bits of the groups of N-bit signals, in which Y is a positive integer, and is a quotient of (N/2). Correspondingly, the second recovery data RD2 is formed of $Y^{th}$ lowest bits of the groups of N-bit signals; however, the present invention is not limited thereto.

FIG. 9 is a circuit diagram of the output data correction unit 370 as shown in FIG. 3. As shown in FIG. 9, circuit architecture of the output data correction unit 370 is described. The output data correction unit 370 includes a first transistor (for example, P-type transistor PM), a second transistor (for example, N-type transistor NM), and a multiplexer 910. First ends (for example, source ends) of the P-type transistor PM and the N-type transistor NM are respectively coupled to a system voltage VDD and a ground voltage VSS, second ends (for example, drain ends) of the P-type transistor PM and the N-type transistor NM are coupled to each other, and control ends (for example, gate ends) of the P-type transistor PM and the N-type transistor NM respectively receive the right-shift signal RTS and the left-shift signal LFS.

Referring to FIG. 9 again, a first end of the multiplexer 910 receives first recovery data RD1, a second end of the multiplexer 910 receives second recovery data RD2, and a control end of the multiplexer 910 is coupled to the drain ends of the P-type transistor PM and the N-type transistor NM. Therefore, when the right-shift signal RTS is logic "1" (enabled), and the left-shift signal LFS is logic "1" (disable), the multiplexer 910 selects and outputs the first recovery data RD1, and when the right-shift signal RTS is logic 0 (disable) and the left-shift signal LFS is logic 0 (enabled), the multiplexer 910 selects and outputs the second recovery data RD2.

Figure 11A:
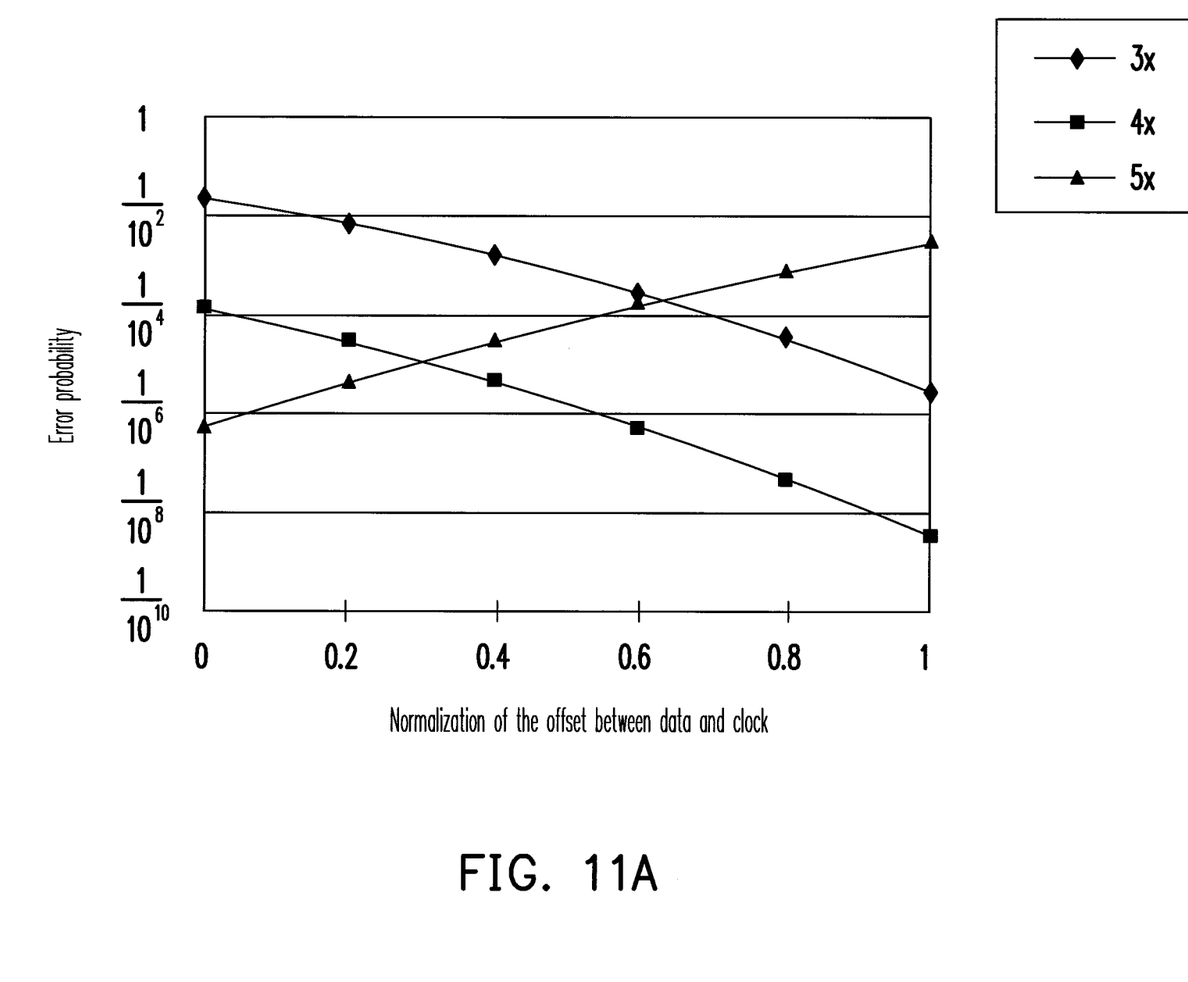
FIG. 11A and FIG. 11B are comparison views of error probabilities of data recovery respectively by using 3×, 5×, and 4× over-sampling technologies of the present invention.
Figure 11B:
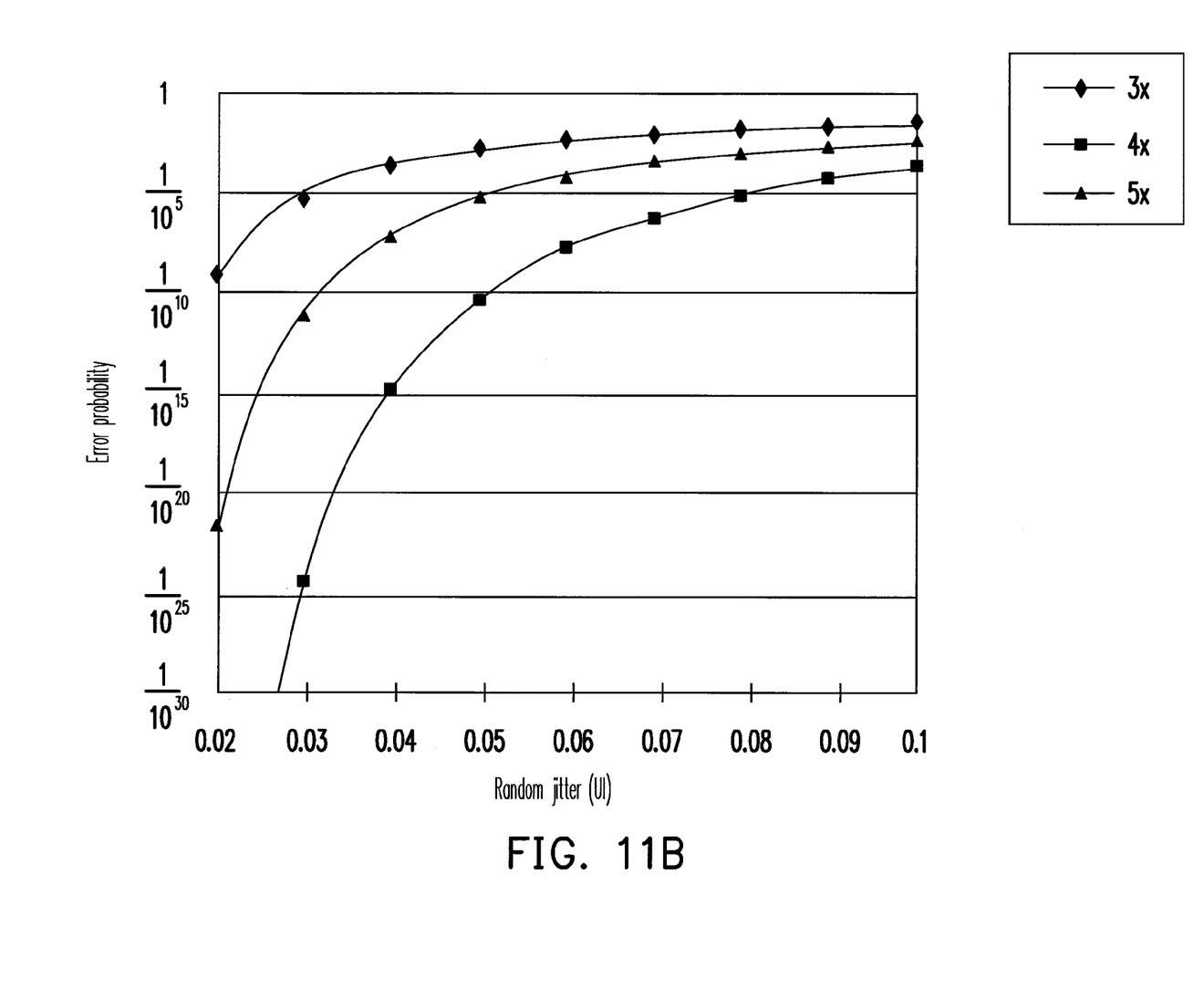

FIG. 11A and FIG. 11B are comparison views of error probabilities of data recovery respectively by using 3× (three-times), 5× (five-times), and 4× (four-times) over-sampling technologies of the present invention. Longitudinal axes of FIG. 11A and FIG. 11B represent error probability of data recovery. Horizontal axis of FIG. 11A represents a case in which offset exists between the clock signal CLK and the serial data SD, and horizontal axis of FIG. 11B represents a region influenced by high-frequency jitter, both in a unit of data unit (UI). It can be known from FIG. 11A and FIG. 11B that the error probability of data recovery by using the 4× over-sampling technology is lower than that using 3× over-sampling technology. In addition, the error probability of data recovery in this embodiment is higher than that of the 5× over-sampling technology, only when the normalization of the offset between data and clock is slightly lower than 0.3, and is persistently lower in other cases. Therefore, FIG. 11A and FIG. 11B prove that the embodiment can provide preferable ISI and high-frequency jitter tolerance, and lower the error probability of data recovery.

Figure 10:
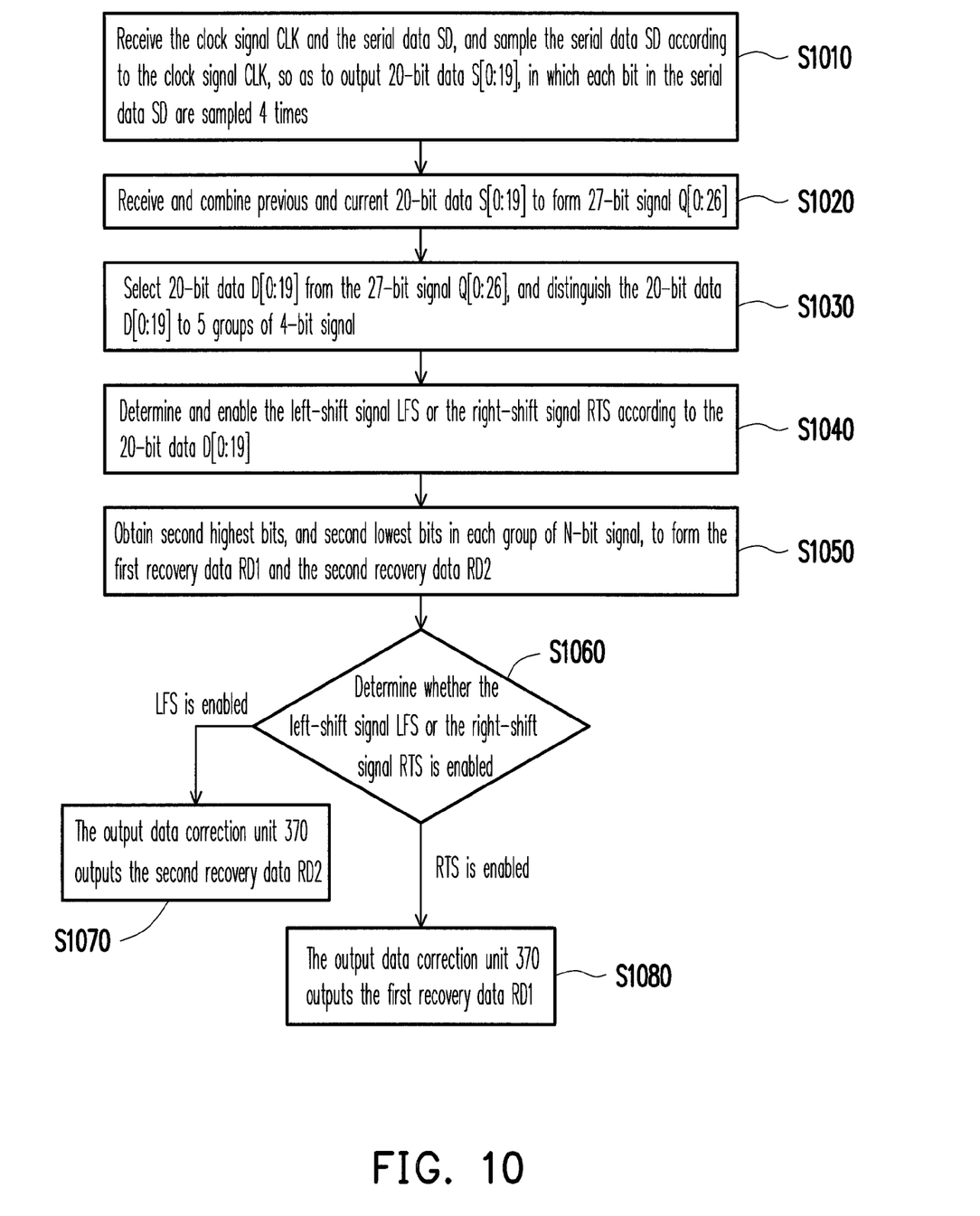
FIG. 10 is a flow chart of a data recovery method by using over-sampling according to an embodiment of the present invention.

From another point of view, FIG. 10 is a flow chart of a data recovery method by using over-sampling according to an embodiment of the present invention. Referring to FIG. 3 and FIG. 10, the data recovery method by using over-sampling includes the following steps. First, in Step S1010, the 4× over-sampling module 310 receives the clock signal CLK and the serial data SD, and samples the serial data SD according to the clock signal CLK, so as to output 20-bit data S[0:19], in which each bit in the serial data SD are sampled 4 times. Then, in Step S1020, the data regeneration unit 340 receives and combines previous and current 20-bit data S[0:19] to form 27-bit signal Q[0:26].

In Step S1030, the phase alignment unit 350 selects 20-bit data D[0:19] from the 27-bit signal Q[0:26], and distinguishes the 20-bit data D[0:19] to 5 groups of 4-bit signal. In Step S1040, the phase decision module 360 determines and enables the left-shift signal LFS or the right-shift signal RTS according to the 20-bit data D[0:19]. In addition, in Step S1050, the output data correction unit 370 obtains second highest bits, and second lowest bits in the groups of N-bit signal, so as to form the first recovery data RD1 and the second recovery data RD2. In Step S1060, the output data correction unit 370 determines whether the left-shift signal LFS or the right-shift signal RTS is enabled. When the left-shift signal LFS is enabled (that is, the left-shift signal LFS is "0"), the Step S1070 is performed to enable the output data correction unit 370 to output the second recovery data RD2. When the right-shift signal RTS is enabled (that is, the right-shift signal RTS is "1"), Step S1080 is performed to enable the output data correction unit 370 to output the first recovery data RD1. Other details of the process and circuit architecture in this embodiment are included in the embodiments above, and thus not repeated here again.

In summary, in the present invention, in order to obtain more accurate recovery data (in other words, in order to make the output over-sampling point closer to the center of the data eye), so as to lower the error probability, the output data correction unit 370 selects and outputs one of two pieces of recovery data that is closer to the center of the data eye, according to the direction of phase adjustment determined by the phase decision module 360, thereby providing good ISI and jitter tolerances, and lowering the error probability of data recovery.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data recovery apparatus by using over-sampling, comprising:
an over-sampling module, used to receive a clock signal and a serial data, and sample the serial data according to the clock signal, so as to output M-bit data, wherein each bit in the serial data is sampled N times, M, and N are positive integers, and N>3;

a data regeneration unit, coupled to the over-sampling module, and used to receive and combine previous and current M-bit data, so as to form a P-bit signal, wherein P is a positive integer and P>M;

a phase alignment unit, coupled to the data regeneration unit, and used to select specific M-bit data from the P-bit signal, and distinguish the specific M-bit data to X groups of N-bit signals, wherein X is a positive integer and M=X×N;

a phase decision module, used to determine a direction of phase adjustment according to the specific M-bit data; and an output data correction unit, coupled to the phase alignment unit and the phase decision module, used to obtain a first specific bit and a second specific bit of each of the groups of N-bit signals, so as to combine into a first and a second recovery data, and select and output the first or the second recovery data according to the direction of phase adjustment.

2. The apparatus according to claim 1, wherein the first recovery data is formed of $Y^{th}$ highest bits in the groups of N-bit signals, the second recovery data is formed of $Y^{th}$ lowest bits in the groups of N-bit signals, and Y is a quotient of N/2; and the phase decision module generates a left-shift signal or a right-shift signal according to the specific M-bit data, the output data correction unit outputs the second recovery data when the left-shift signal is enabled, and the output data correction unit outputs the first recovery data when the right-shift signal is enabled.

3. The apparatus according to claim 2, wherein the output data correction unit comprises:

a first transistor, having a first end coupled to a system voltage, and a control end receiving the left-shift signal;

a second transistor, having a first end coupled to a ground voltage, and a control end receiving the right-shift signal, wherein second ends of the first transistor and the second transistor are coupled to each other; and a multiplexer, having a first end receiving the second recovery data, and a second end receiving the first recovery data, wherein a control end of the multiplexer is coupled to the second ends of the first transistor and the second transistor.

4. The apparatus according to claim 2, wherein the phase decision module comprises:

a phase detection unit, used to calculate a detection signal set according to the specific M-bit data; and a phase decision unit, coupled to the phase detection unit, and used to output the left-shift signal or the right-shift signal according to the detection signal set.

5. The apparatus according to claim 4, wherein the over-sampling module samples each bit in the serial data 4 times.

6. The apparatus according to claim 5, wherein the phase detection unit comprises:

X detection circuits, wherein each detection circuit is used to receive the corresponding group of 4-bit signals and generate a detection left-shift signal and a detection right-shift signal, and the detection left-shift signals and the detection right-shift signals respectively generated by the X detection circuits form the detection signal set.

7. The apparatus according to claim 6, wherein each detection circuit comprises:

a first XNOR gate, used to receive first bit data and second bit data of the corresponding group of 4-bit data, so as to generate a signal a;

a second XNOR gate, used to receive the second bit data and third bit data of the corresponding group of 4-bit data, so as to generate a signal b;

a third XNOR gate, used to receive the third bit data and fourth bit data of the corresponding group of 4-bit data, so as to generate a signal c;

a fourth XNOR gate, used to receive the signal a and the signal b to generate a signal d;

a fifth XNOR gate, used to receive the signal b and the signal c to generate a signal e;

a first NOT gate, used to receive the signal d;

a sixth XNOR gate, coupled to an output end of the first NOT gate and receive the signal e;

a first NAND gate, coupled to an output end of the sixth XNOR gate and receive the signal b to generate the detection right-shift signal;

a second NOT gate, used to receive the signal e;

a seventh XNOR gate, coupled to an output end of the second NOT gate and receive the signal d; and a second NAND gate, coupled to an output end of the seventh XNOR gate and receive the signal b to generate the detection left-shift signal.

8. The apparatus according to claim 4, wherein the phase decision unit comprises a determination process, comprising:

increasing a right shift flag by 1 when a number of the enabled detection right-shift signals in the detection signal set is greater than 2, or otherwise, resetting the right shift flag;

increasing a left shift flag by 1 when a number of the enabled detection left-shift signals in the detection signal set is greater than 2, or otherwise, resetting the left shift flag;

enabling the right-shift signal, and resetting the right shift flag when the right shift flag is greater than 3; and enabling the left-shift signal, and resetting the left shift flag when the left shift flag is greater than 3.

9. The apparatus according to claim 1, wherein the M-bit data and the specific M-bit data have 20 bits, the specific M-bit data is distinguished to 5 groups of 4-bit signals, and first bit data, fifth bit data, ninth bit data, thirteenth bit data, and seventeenth bit data in the specific M-bit data serve as the first recovery data, and second bit data, sixth bit data, tenth bit data, fourteenth bit data, and eighteenth bit data in the specific M-bit data serve as the second recovery data.

10. The apparatus according to claim 1, wherein the over-sampling module comprises:

a phase-locked loop (PLL), used to receive the clock signal to generate M multiphase clock signals; and an over-sampler, coupled to the PLL, and used to sample the serial data according to the multiphase clock signals, so as to output the M-bit data, wherein each bit in the serial data is sampled N times.

11. A data recovery method by using over-sampling, comprising:

receiving a clock signal and a serial data, and sample the serial data according to the clock signal, so as to output M-bit data, wherein each bit in the serial data is sampled N times, M, and N are positive integers, and N>3;

receiving and combining previous and current M-bit data to form a P-bit signal, wherein P is a positive integer and P>M;

selecting a specific M-bit data from the P-bit signal, and distinguishing the specific M-bit data into X groups of N-bit signals, wherein X is a positive integer and M=X×N;

determining a direction of phase adjustment according to the specific M-bit data;

obtaining a first specific bit and a second specific bit of each of the groups of N-bit signals, so as to combine into a first and a second recovery data; and selecting and outputting the first or the second recovery data according to the direction of phase adjustment.

12. The method according to claim 11, wherein the first recovery data is formed of $Y^{th}$ highest bits in the groups of N-bit signals, the second recovery data is formed of $Y^{th}$ lowest bits in the groups of N-bit signals, and Y is a quotient of N/2; and the outputting the first or the second recovery data according to the direction of phase adjustment comprises:

generating a left-shift signal or a right-shift signal according to the specific M-bit data;

outputting the second recovery data when the left-shift signal is enabled; and outputting the first recovery data when the right-shift signal is enabled.

13. The method according to claim 11, wherein the determining the direction of phase adjustment according to the specific M-bit data comprises:

calculating a detection signal set according to the specific M-bit data; and outputting the left-shift signal or the right-shift signal according to the detection signal set.

14. The method according to claim 13, wherein the calculating the detection signal set comprises:

receiving each group of N-bit signals, and generating a detection left-shift signal and a detection right-shift signal according to each group of N-bit signals, wherein the detection left-shift signals and the detection right-shift signals respectively generated according to the groups of N-bit signals form the detection signal set.

15. The method according to claim 14, wherein the outputting the left-shift signal or the right-shift signal according to the detection signal set comprises:

increasing a right shift flag by 1 when a number of the enabled detection right-shift signals in the detection signal set is greater than 2, or otherwise, resetting the right shift flag;

increasing a left shift flag by 1 when a number of the enabled detection left-shift signals in the detection signal set is greater than 2, or otherwise, resetting the left shift flag;

enabling the right-shift signal, and resetting the right shift flag when the right shift flag is greater than 3; and enabling the left-shift signal, and resetting the left shift flag when the left shift flag is greater than 3.

16. The method according to claim 12, wherein the oversampling module samples each bit in the serial data 4 times, the specific M-bit data has 20 bits, the specific M-bit data is distinguished to 5 groups of 4-bit signals, and first bit data, fifth bit data, ninth bit data, thirteenth bit data, and seventeenth bit data in the specific M-bit data serve as the first recovery data, and second bit data, sixth bit data, tenth bit data, fourteenth bit data, and eighteenth bit data in the specific M-bit data serve as the second recovery data.

* * * * *